US006169158B1

(12) United States Patent
Rickert et al.

(10) Patent No.: US 6,169,158 B1
(45) Date of Patent: Jan. 2, 2001

(54) POLYGLYCIDYL COMPOUNDS

(75) Inventors: Christoph Rickert; Hugh Stephen Laver, both of Reinach (CH)

(73) Assignee: Vantico, Inc., Brewster, NY (US)

( * ) Notice: Under 35 U.S.C. 154(b), the term of this patent shall be extended for 0 days.

(21) Appl. No.: 09/298,573

(22) Filed: Apr. 23, 1999

Related U.S. Application Data

(63) Continuation-in-part of application No. 09/110,594, filed on Jul. 6, 1998, now abandoned.

(30) Foreign Application Priority Data

Jul. 16, 1997 (CH) ............................................. 1744

(51) Int. Cl.[7] .......................... C08G 59/02; C08G 59/40; C08F 20/34; C08F 283/10; C07D 303/26
(52) U.S. Cl. .............................. 528/97; 528/98; 528/110; 528/112; 528/114; 525/438; 525/530; 525/533; 525/934; 549/557; 549/560
(58) Field of Search .................... 549/557, 560; 528/97, 98, 110, 112, 114; 525/438, 530, 533, 934

(56) References Cited

U.S. PATENT DOCUMENTS

| 3,909,263 | 9/1975 | Yoshida et al. | 96/3 |
|---|---|---|---|
| 4,605,789 | 8/1986 | Silvis et al. | 568/721 |
| 4,672,102 | 6/1987 | Silvis et al. | 528/97 |
| 4,690,998 | 9/1987 | Wahle et al. | 528/97 |

FOREIGN PATENT DOCUMENTS

| 2645020 | 4/1978 | (DE). |
| 1167489 | 10/1969 | (GB). |
| 63-150270 | 6/1988 | (JP). |
| 6-009753 | 1/1994 | (JP). |

OTHER PUBLICATIONS

Derwent Abstr. 96–236062/24, JP 8092231–A, Apr. 9, 1996.
Chem. Abstr. 125:302859r, JP 08217852, Aug. 27, 1996, Ibuki et al.
Chem. Abstr. 127:51612z, JP 09124769, May 13, 1997.
Chem. Abstr. 125:59352u, JP 08092231, Apr. 9, 1996, Ishida et al.

*Primary Examiner*—Ba K. Trinh
(74) *Attorney, Agent, or Firm*—Michele A. Kovaleski

(57) ABSTRACT

The present invention is directed to a polyglycidyl compound having on average more than two, preferably more than two and a half, particularly preferably more than three, glycidyl groups per molecule and a $T_g$ value (determined by DSC, heating rate=20° C./min) higher than 20° C., based on a polyfunctional 1,1'-spirobisindane of formula I or on a mixture of different polyfunctional 1,1'-spirobisindanes of the general formula I

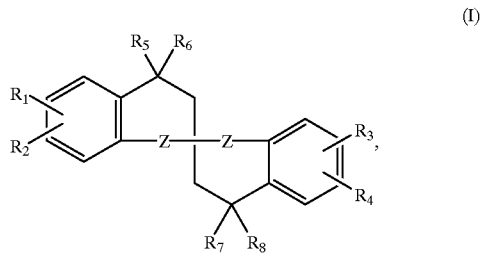

(I)

wherein
  Z is a direct single bond or —O—;
  more than two of $R_1$, $R_2$, $R_3$ and $R_4$ are —OH, —O—CO—R—CO—OH, —O—R—OH, —O—CO—NH—R—NH—CO—O—R—OH or —[O—$C_mH_{2m}$]$_n$—OH, with the proviso that $R_1$, $R_2$, $R_3$ and $R_4$ are not —OH when Z is a direct single bond, wherein
  m is an integer from 2 to 4,
  n is an integer from 1 to 20, and
  R is $C_1$–$C_8$alkylene, $C_5$–$C_8$cycloalkylene, $C_6$–$C_{14}$arylene or
  partially hydrated $C_6$–$C_{14}$arylene,
  and the remaining $R_1$, $R_2$, $R_3$ and $R_4$ are a hydrogen atom or —O—$C_1$–$C_8$alkyl, —O—$C_5$–$C_8$cycloalkyl, —O—$C_6$–$C_{14}$aryl, partially hydrated —O—$C_6$–$C_{14}$aryl or (meth)acrylate;
  and
  $R_5$, $R_6$, $R_7$ and $R_8$ are each independently of one another $C_1$–$C_8$alkyl, $C_5$–$C_8$cycloalkyl, $C_6$–$C_{14}$aryl, partially hydrated $C_6$–$C_{14}$aryl or a hydrogen atom, for the production of moulded articles, coatings, matrix materials or adhesives. Also disclosed is the reaction product of a polyglycidyl compound based on a polyfunctional 1,1'-spirobisindane or mixture thereof with a less than stoichiometric amount of a compound containing two substitutents reacting with epoxy groups.

22 Claims, No Drawings

POLYGLYCIDYL COMPOUNDS

This is a continuation-in-part of application Ser. No. 09/110,594, filed on Jul. 6, 1998 now abandoned.

Polyglycidyl compounds

The present invention relates to polyglycidyl compounds based on spirobisindanes, to a process for the preparation of these compounds as well as to their use for the production of moulded articles, coatings, matrix materials, casting compounds or adhesives.

At present, polyglycidyl compounds are frequently used as reactive component in curable compositions, for example as hardeners or crosslinkers in powder coating compositions based on polyesters and polyacrylates. Many polyglycidyl compounds containing more than two epoxy groups have as such the disadvantage of being liquid either at room temperature or at a little above room temperature. Typical representatives of these viscous resins are, for example, the triglycidyl ester of trimellitic acid and the diglycidyl ester of 1,2-cyclohexanedicarboxylic acid. In practice, the homogeneous incorporation of these liquid compounds into solid compositions requires substantially more elaborate processing than is the case when using glycidyl compounds which are already solid.

The main component of the solid polyglycidyl compounds are diglycidyl compounds based on bisphenol A. These in turn have disadvantages if they are used as sole crosslinker for curable compositions. They are not suitable for the production of coatings which are resistant to outdoor weathering.

An improved flow behaviour is still to be desired regarding the known systems for outdoor weathering-resistant powder coating compositions based on e.g. polyesters and glycidyl compounds such as Araldite® PT 810 (triglycidyl isocyanurate [TGIC]).

Furthermore, JP Kokai Hei 8-92231 describes a crystalline, purely bifunctional 6,6'-diglycidyloxy-3,3',3,3'-tetramethyl-1,1'-spirobisindane having a melting point of 80–140° C. which, owing to its high melt flow and low hydrolisable chlorine content, was developed for the production of electronic materials. JP Kokai Hei 8-217852 and JP Kokai Hei 9-124769 describe purely bifunctional 6,6'-diglycidyloxy-3,3',3,3'-tetraalkyl- 1,1'-spirobisindanes which are used in cured mixtures with phenol- or naphthol-based resins, preferably for sealing semi-conductor modules.

FR 2322161 A1 describes a process for the preparation of epoxy resins by condensation of a polyhydroxy spirobisindane of the formula

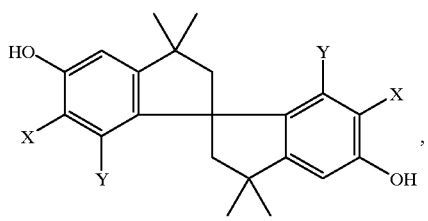

wherein X and Y are each independently of one another H, $CH_3$, OH or Cl, with epichlorohydrin in the presence of a alkali hydroxide, characterized by using said alkali hydroxide solved in a low-weight alcohol (f.e. methanol or ethanol). The examples, by said process epoxidized 3,3,3',3'-tetramethyl-5,5.6',6'-tetrahydroxy-1,1'-spirobisindane, had an epoxy value below the theory.

It is the object of this invention to provide novel multi-functional and weather-resistant epoxy compounds which are solid at room temperature and which can be used, for example, as hardeners in polyester powder coating systems where they may replace, inter alia, TGIC as hardener. In this application, compounds that are solid at room temperature will be understood as meaning compounds having a $T_g$ value (determined by DSC, heating rate=20° C./min) higher than 20° C.

The object of this invention is achieved by providing a novel polyglycidyl compound having on average more than two, preferably more than two and a half, particularly preferably more than three, glycidyl groups per molecule and a $T_g$ value (determined by DSC, heating rate=20° C./min) higher than 20° C., based on a polyfunctional 1,1'-spirobisindane of formula I or on a mixture of different polyfunctional 1,1'-spirobisindanes of the general formula I

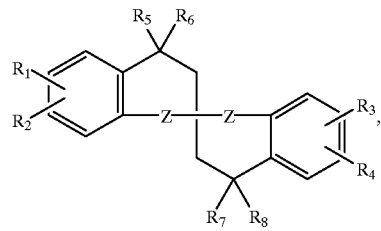

(I)

wherein
Z is a direct single bond or —O—; more than two of $R_1$, $R_2$, $R_3$ and $R_4$ are —OH, —O—CO—R—CO—OH, —O—R—OH,
—O—CO—NH—R—NH—CO—O—R—OH or —[O—$C_mH_{2m}$]$_n$—OH, with the proviso that $R_1$, $R_2$, $R_3$ and $R_4$ are not —OH when Z is a direct single bond, wherein
m is an integer from 2 to 4,
n is an integer from 1 to 20, and
R is $C_1$–$C_8$alkylene, $C_5$–$C_8$cycloalkylene, $C_6$–$C_{14}$arylene or
partially hydrated $C_6$–$C_{14}$arylene,
and the remaining $R_1$, $R_2$, $R_3$ and $R_4$ are a hydrogen atom or —O—$C_1$–$C_8$alkyl, —O—$C_5$–$C_8$cycloalkyl, —O—$C_6$–$C_{14}$aryl, partially hydrated —O—$C_6$–$C_{14}$aryl or (meth)acrylate; and
$R_5$, $R_6$, $R_7$ and R8 are each independently of one another $C_1$–$C_8$alkyl, $C_5$–$C_8$cycloalkyl, $C_6$–$C_{14}$aryl, partially hydrated $C_6$–$C_{14}$aryl or a hydrogen atom.

$R_5$, $R_6$, $R_7$ and $R_8$ defined as $C_1$–$C_8$alkyl are straight-chain or branched radicals, for example methyl, ethyl, n-propyl, isobutyl, sec-butyl and tert-butyl as well as the different isomers of pentane, hexane, heptane and octane.

$R_5$, $R_6$, $R_7$ and $R_8$ defined as $C_5$–$C_8$cycloalkyl are, for example, radicals containing 5 to 8 ring-carbon atoms, e.g. of cyclopentane, cyclohexane, cycloheptane and cyclooctane as well as their substitution products, in particular their alkyl substitution products, such as the $C_1$–$C_4$alkyl substitution products.

$R_5$, $R_6$, $R_7$ and $R_8$ defined as $C_6$–$C_{14}$aryl can be, for example, phenyl, tolyl, pentalinyl, indenyl, napthyl, azulinyl and anthryl.

$R_5$, $R_6$, $R_7$ and $R_8$ defined as partially hydrated $C_6$–$C_{14}$aryl are understood as being aryls which are partially hydrated by addition of hydrogen to one or several double bonds of the aromatic aryl, for example compounds of formula:

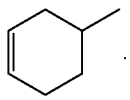

$R_1$, $R_2$, $R_3$ and $R_4$ defined as —O—$C_1$–$C_8$alkyl, —O—$C_5$–$C_8$cycloalkyl, —O—$C_6$–$C_{14}$aryl or partially hydrated —O—$C_6$–$C_{14}$aryl have the same meaning as that given above for the corresponding radicals which are not bound to oxygen.

R defined as $C_1$–$C_8$alkylene is understood as being the straight-chain bifunctional groupings —$(CH_2)_n$—, wherein n=1 to 8, i.e. for example methylene, ethylene, n-propylene, as well as the branched bifunctional groupings of propene, butene, pentene, hexene, heptene and octene.

R defined as $C_5$–$C_8$cycloalkylene containing 5 to 8 ring-carbon atoms may be, for example, 1,2- and 1,3-cyclopentenyl, 1,2-, 1,3- and 1,4-hexenyl, 1,2-, 1,3-, and 1,4-heptenyl and 1,2-, 1,3-, 1,4- and 1,5-octenyl, 1,2-norbornyl as well as their substitution products, in particular their alkyl substitution products, such as the $C_1$–$C_4$alkyl substitution products.

R defined as $C_6$–$C_{14}$arylene may be, for example, phenylene, tolylene, pentalinylene, indenylene, napthylene, azulinylene and anthrylene.

R defined as partially hydrated $C_6$–$C_{14}$arylene is understood as meaning arylenes which are partially hydrated by addition of hydrogen to one or several double bonds of the aromatic arylene.

Within the present context, the term "polyglycidyl compounds" will be understood as meaning compounds containing unsubstituted glycidyl groups as well as compounds containing glycidyl groups which are substituted by alkyl groups, preferably methyl groups. The polyglycidyl compounds obtained after the glycidylisation of the polyfunctional 1,1'-spirobisindanes are always polyglycidyl ethers or polyglycidyl esters.

The basic bodies of formula I, in which —Z— is a direct bond, are known and are prepared by varying the starting compounds in analogy to the synthesis of 3,3,3',3'-tetramethyl-5,5',6,6'-tetrahydroxy-1,1'-spirobisindane (SBI), for example according to Wilson Baker, J.Chem.Soc 1678 (1934).

$R_1$, $R_2$, $R_3$ and $R_4$ are accordingly determined by the choice of the radicals of the phenolic basic body used (in the case of SBI using pyrocatechol, i.e. 1,2-dihydroxybenzene), or by reacting the hydoxyl groups of the basic body by known subsequent reactions (reaction with anhydrides, etherification etc.), whereas $R_5$, $R_6$, $R_7$ and $R_8$ are determined by varying the ketone used (using e.g. acetone, i.e. dimethyl ketone, for the preparation of SBI).

The basic bodies of formula 1, in which —Z— is an oxygen bridge —O—, are known and can be prepared, for example, according to U.S. patent U.S. Pat. No. 3,764,337. $R_1$, $R_2$, $R_3$ and $R_4$, and also $R_5$, $R_6$, $R_7$ and $R_8$, can be varied here in the manner described above.

To prepare the novel polyglycidyl compounds, a polyfunctional 1,1'-spirobisindane of formula I or a mixture of different polyfunctional 1,1'-spirobisindanes of formula I is reacted by one of the known processes with a stoichiometric excess of glycidyl chloride or β-methylglycidyl chloride in the presence of a suitable catalyst and, after adding a base, excess glycidyl chloride or β-methylglycidyl chloride is removed by distillation. A general overview may be found, inter alia, in Lee Neville "Handbook of Epoxy Resins", McGraw Hill Book Company, 1982, chapter 3.

In another method for the preparation of the novel poyglycidyl compounds, a polyfunctional 1,1'-spirobisindane of formula I or a mixture of different polyfunctional 1,1'-spirobisindanes of formula I is converted by known processes to epoxy resins by etherification with unsubstituted allyl halides or with allyl halides which are substituted by $C_1$–$C_4$alkyl radicals, e.g. methyl radicals, and by subsequent oxidation of the olefins using suitable oxidants.

A general overview on which oxidants are suitable for converting olefins into epoxides may also be found in Lee Neville "Handbook of Epoxy Resins", McGraw Hill Book Company 1982, chapter 3.

The compounds of formula I are preferably compounds, in which Z is a direct single bond.

The polyglycidyl compounds based on basic bodies according to formula I are particularly preferably those, wherein all $R_1$, $R_2$, $R_3$ and $R_4$ are —OH, —O—CO—R—CO—OH, —O—R—OH, —O—CO—NH—R—NH—CO—O—R—OH or —[O—$C_mH_{2m}]_n$—OH, and m, n and R have the meanings cited above.

Of these compounds those are in turn preferred, wherein $R_1$, $R_2$, $R_3$ and $R_4$ are —OH or —O—CO—R—CO—OH, and R has the meaning given above.

Again, of these compounds those are preferred, wherein R is $C_5$–$C_8$cycloalkan-1,2-ylene.

When synthesising compounds of formula I, $R_5$, $R_6$, $R_7$ and $R_8$ are determined, as mentioned above, by varying the ketone used.

In this case, those polyglycidyl compounds are preferred, wherein $R_5$, $R_6$, $R_7$ and $R_8$ are each independently of one another $C_1$–$C_8$alkyl or a hydrogen atom.

Those polyglycidyl compounds are particularly preferred, wherein all $R_5$, $R_6$, $R_7$ and $R_8$ are $C_1$–$C_4$alkyl, preferably methyl.

Those polyglycidyl compounds are most preferred, which are based on compounds of formula I, wherein all $R_1$, $R_2$, $R_3$ and $R_4$ are hydroxyl and all $R_5$, $R_6$, $R_7$ and $R_8$ are methyl and —Z— is a direct bond.

In another of its aspects, this invention relates to a reaction product obtained from the reaction of a polyglycidyl compound having on average more than two glycidyl groups per molecule and a $T_g$ value (determined by DSC, heating rate=20° C./min) higher than 20° C., based on a polyfunctional 1,1'-spirobisindane of formula II or on a mixture of different polyfunctional 1,1'-spirobisindanes of the general formula II

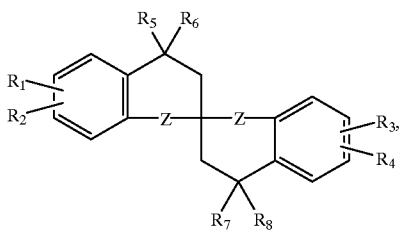

(II)

wherein
Z is a direct single bond or —O—; more than two of $R_1$, $R_2$, $R_3$ and $R_4$ are —OH, —O—CO—R—CO—OH, —O—R—OH, —O—CO—NH—R—NH—CO—O—R—OH or —[O—$C_mH_{2m}$]$_n$—OH, wherein
m is an integer from 2 to 4,
n is an integer from 1 to 20, and
R is $C_1$–$C_8$alkylene, $C_5$–$C_8$cycloalkylene, $C_6$–$C_{14}$arylene or
partially hydrated $C_6$–$C_{14}$arylene,
and the remaining $R_1$, $R_2$, $R_3$ and $R_4$ are a hydrogen atom or —O—$C_1$–$C_8$alkyl, —O—$C_5$–$C_8$cycloalkyl,
—O—$C_6$–$C_{14}$aryl, partially hydrated —O—$C_6$–$C_{14}$aryl or (meth)acrylate; and
$R_5$, R6, $R_7$ and R8 are each independently of one another $C_1$–$C_8$alkyl, $C_5$–$C_8$cycloalkyl, $C_6$–$C_{14}$aryl, partially hydrated $C_6$–$C_{14}$aryl or a hydrogen atom,
with a less than stoichiometric amount of a compound containing two substituents reacting with epoxy groups. The compounds described so far can be reacted in analogy to known glycidyl compounds with compounds reacting with epoxy groups.

These reaction products are particularly preferred if the polyglycidyl compound and the compound containing two substituents reacting with epoxy groups are used in such amounts that there are 0.01–0.75 of those groups which react with an epoxy resin per one epoxy group of the polyglycidyl compound. Such reactions are particularly suitable for adjusting the glass transition temperature ($T_g$) to the respective requirements, i.e. usually to increase the $T_g$.

The use of reaction products is also preferred if the compound containing two substituents reacting with epoxy groups is a compound of formula HO—CO—$R_9$—CO—OH, HO—$R_9$—OH, H—[O—$R_9$—O—CO—NH—$R_9$—NH—CO]$_v$—O—$R_9$—OH or H—[O—$C_uH_{2u}$]$_v$—OH, wherein
u is an integer from 2 to 4,
v is an integer from 1 to 20, and
$R_9$ is C1–C8alkylene, C5–C8cycloalkylene, C6–C14arylene or partially hydrated C6–C14arylene, wherein
$R_9$ is preferably C5–C8cycloalkan-1,2-ylene or C5–C8cycloalkan-1,4-ylene.

$R_9$ can, for example, correspond to those radicals which were cited above for R.

It is also preferred to use reaction products if the compound containing two substituents reacting with epoxy groups is 1,4-cyclohexanedicarboxylic acid or a cyclic anhydride. Typical examples thereof are the anhydrides of phthalic acid or of hexahydrophthalic acid.

The novel compounds are valuable formulation components for curable compositions which comprise one of the novel polyglycidyl compounds or its reaction products and a compound reacting therewith with crosslinking. The novel compounds can be combined with all customary crosslinkers or hardeners for epoxy resins. The novel polyglycidyl compounds or their reaction products, where required also in combination with other epoxy resins, can be used for all applications in which epoxy resins are used, for example for the preparation of adhesives, moulding articles and coatings.

A preferred field of use for the novel compounds are powder coating applications which are described in more detail below as Use Example. The novel compounds can in this case replace, for example, the triglycidyl isocyanurate [TGIC] which is particularly widely used in this technology, without requiring any substantial changes in the other components of the powder coatings or in the preparation of coating formulations and without having to consider drawbacks with regard to the technical aspects of applying coating compositions.

This invention therefore also relates to powder coatings comprising a carboxyl-terminated polyester and/or a free carboxyl group-containing acrylic resin as compound which reacts with crosslinking, which powder coatings comprise one of the above compounds, employing it as crosslinker.

The (meth)acrylate polymer is in this case preferably a copolymer of one or several acrylates and/or methacrylates, preferably of the corresponding alkyl esters containing 1 to 18, more preferably 1 to 8, carbon atoms in the alkyl group, with acrylic acid and/or methacrylic acid and, optionally, with additional ethylenically unsaturated comonomers. The (meth)acrylate polymer has, for example, a molecular weight (number average Mn from GPC measurement with polystyrene standardisation) of 500 to 30000, preferably of 1000 to 10000. It furthermore preferably comprises 0.2 to 6 equivalents of free carboxyl groups. The glass transition temperature of the (meth)acrylate polymers is conveniently above 20° C., preferably in the range from 30 to 100° C. Typical examples of suitable (meth)acrylate monomers are ethyl acrylate, butyl acrylate, 2-ethylhexyl acrylate and also, preferably, $C_1$–$C_4$alkylmethacrylates, such as methyl methacrylate, ethyl methacrylate or butyl methacrylate. (Meth)acrylate derivatives containing silane groups may also be used. Suitable ethylenically unsaturated comononers are, for example, acrylo- or methacrylonitriles and also vinyl compounds. Preferred comonomers are vinyl aromatic compounds, in particular styrene. The above polymers can be prepared in known manner, for example by polymerising the monomers dissolved in suitable organic solvents, in particular in toluene or in mixtures of 1-methoxy-2-propanol, 1-methoxy-2-propylacetate and methyl isobutyl ketone (typically at a weight ratio of 70/20/10) in the presence of a suitable initiator, such as dicumyl peroxide, and of a chain-transfer agent such as thioglycolic acid. They can also be polymerised in the mass.

The carboxyl group-containing polyesters preferably have an acid number (given in mg KOH/g polyester) from 10 to 100 and a molecular weight (number average Mn) from 2000 to 10000. In the case of these polyesters, the ratio of Mw (weight average of the molecular weight) to Mn is usually from 2 to 10. These polyesters are preferably solid at room temperature and preferably have a glass transition temperature from 35 to 120° C., preferably from 40 to 80°

C. They are condensates of polyols with dicarboxylic acids and, optionally, polyfunctional carboxylic acids (e.g. di-, tri- or tetracarboxylic acids) or the corresponding carboxylic acid anhydrides. Suitable polyols are, for example, ethylene glycol, diethylene glycol, propylene glycol, butylene glycol, 1,3-butanediol, 1,4-butanediol, neopentanediol, isopentyl glycol, 1,6-hexanediol, glycerol, hexanetriol, trimethylolethane, trimethylolpropane, erythritol, pentaerythritol, cyclohexanediol or 1,4-dimethylolcyclohexane. Suitable dicarboxylic acids are, for example, isophthalic acid, terephthalic acid, phthalic acid, methylphthalic acids, tetrahydrophthalic acid, methyltetrahydrophthalic acids, e.g. 4-methyltetrahydrophthalic acid, cyclohexane-dicarboxylic acids, succinic acid, glutaric acid, adipic acid, pimelic acid, suberic acid, azelaic acid, sebacic acid, dodecanedicarboxylic acid, fumaric acid, maleic acid or 4,4'-diphenyldicarboxylic acid, etc. Suitable tricarboxylic acids are typically aliphatic tricarboxylic acids, such as 1,2,3-propanetricarboxylic acid, aromatic tricarboxylic acids, such as trimesic acid, trimellitic acid and hemimellitic acid, or cycloaliphatic tricarboxylic acids, such as 6-methylcyclohex-4-ene-1,2,3-tricarboxylic acid. Suitable tetracarboxylic acids are, for example, pyromellitic acid or benzophenone-3,3',4,4'-tetracarboxylic acid. Commercially available polyesters are often based on neopentyl glycol and/or trimethylol-propane as main alcoholic components as well as on adipic acid and/or terephthalic acid and/or isophthalic acid and/or trimellitic acid as main acid components.

The cited curable compositions preferably comprise the epoxy resin and the additional polymer in such amounts that the ratio of free carboxyl groups to epoxy groups in the composition is from 0.5 to 1 to 2 to 1, preferably from 0.8 to 1 to 1.2 to 1, more preferably about 1 to 1.

It is also possible to use other types of epoxy hardeners customarily used for powder coatings in combination with the novel polyglycidyl compounds, for example diglycidyl terephthalate or glycidyl methacrylate homo- or copolymers (described, inter alia, in EP 0 653 466 A2). Such epoxy resin mixtures can provide coatings having a particularly advantageous property profile with respect to the technical aspects of application because they permit adjusting or optimising the properties to the polyesters used. Epoxy resin mixtures having an epoxy value of 1–10 equivalents/kg are preferred.

The curable compositions of this invention can also comprise other customary components, such as catalysts and/or accelerators, for example Actirone® NXJ-60 (2-propylimidazole), Actiron® NXJ-60 P (60% by weight of 2-propylimidazole per 40% by weight of solid carrier material), Beschleuniger® DT 3126 ([$C_{16}H_{33}N(CH_3)_3$]$^+$Br) or triphenylphosphine, to enable a sufficiently fast curing reaction even at relatively low temperatures, for example in the range from 60 to 160° C.

These catalysts are often an organic amine or a derivative of an amine, preferably a tertiary amine or a nitrogen-containing heterocyclic compound. Catalysts preferred for the reaction of epoxy groups with carboxyl groups are phenylimidazole, N-benzyldimethylamine and 1,8-diazabicyclo[5,4,0]-7-undecene, where required on a silicate carrier material. The catalyst or a catalyst mixture is usefully added in an amount from about 0.1 to 10, preferably from 0.5 to 5% by weight.

The novel curable compositions may additionally contain further customary additives, for example light stabilisers, colourants, pigments, e.g. titanium dioxide, degassing agents, e.g. benzoin, adhesives, thixotropic agents and/or flow control agents. The novel curable compositions may also contain a suitable inert solvent or solvent mixture, for example xylene, butyl acetate, isobutanol, 1-methoxy-2-propanol, 1-methoxy-2-propyl acetate or methyl isobutyl ketone (MIBK).

The curable compositions of this invention can be used in the standard areas of curable epoxy resin composition technology, i.e. for example as coating composition, casting resin, impregnating resin, laminating resin, adhesive or sealing material.

Powder coatings of this invention can be prepared by simply mixing the components, for example in a ball mill. Another possibility, which is more preferred, is that which comprises fusing all the components, mixing and homogenising them, preferably in an extruder, such as in a Buss ko-kneader, cooling the mixture and commenting it. The powder coating mixtures preferably have an average particle size in the range from 0.015 to 500 μm, more preferably from 10 to 100 μm.

Depending on their application, the powder coatings are cured on the object to be coated at a temperature of at least 100° C., preferably from 150 to 250° C. Curing usually requires about 5 to 60 minutes. Objects and materials suitable for coating are all those which are stable at the temperatures required for curing, in particular metals and ceramics.

The use of, in particular, polyesters which consist to 50% by weight, preferably to 90% by weight and more (relative to the diol component), of neopentanediol and of aromatic or cycloaliphatic dicarboxylic acids, in particular terephthalic acid, as modules and which are commercially available e.g. as Crylcoat® types [UCB] or under names such as Uralac® [DSM] or Grilesta® [EMS], provides powder coatings which result in weather-resistant coatings suitable for outdoor coatings and which are particularly flexible with respect to sudden or also prolonged mechanical stress.

USE EXAMPLES

EXAMPLE A

Synthesis of 3,3,3',3'-tetramethyl-5,5',6,6'-tetrahydroxy-1,1,'-spirobisindane (SBI)

The synthesis is carried out according to Wilson Baker, J.Chem.Soc 1678 (1934).

297.3 g (2.7 mol) of pyrocatechol (Fluka) (1,2-dihydoxybenzene) are dissolved in 320 ml of acetone and 700 ml of glacial acetic acid (Fluka). Subsequently, 540 ml of conc. hydrochloric acid are added and the mixture is refluxed for 1½ days, during which time an growing precipitate gradually forms. The reaction mixture is allowed to cool to room temperature and the precipitate is then collected by filtration and washed twice with about 1 litre of a mixture of water and acetic acid at a ratio of 1:1 and, finally, with pure water until the pH of the filtrate is neutral. The precipitate is dried overnight in a vacuum oven (80° C./50 mbar).

This gives 262.2 g (57.0% of theory) of SBI in the form of a slightly beige powder having a degree of purity of >95% (HPLC, 230 nm).

NMR data of SBI:

¹H-NMR (DMSO, 250 MHz, TMS standard, in ppm): 8.48 (s, br, 4H), 6.44 (s, 2H), 6.01 (s, 2H), 2.11 (d, J=12.8 Hz, 2H), 1.94 (d, J=12.8 Hz, 2H), 1.19 (s, 3H), 1.13 (s, 3H)

¹³C-NMR (DMSO, 62.9 MHz, TMS standard, in ppm): 141.14 (s), 138.71 (s), 137.37 (s), 106.70 (d), 104.86 (d), 56.11(t), 52.87 (s), 28.11(q), 27.06 (q)

Example 1

Glycidylisation of SBI to 3,3,3',3'-tetramethyl-5,5', 6,6'-tetraglycidyloxy-1,1'-spirobisindane (SBI-G)

177.3 g (0.5 mol) of SBI of the above Example A are suspended in 1100 ml (14.0 mol) of epichlorohydrin. To this suspension are added 11.78 g (53.75 mmol) of a 50% aqueous solution of tetramethyl ammonium chloride (TMAC). This mixture is heated to 70–80° C. under vacuum (250 mbar). The homogeneous solution obtained after about 1 hour is then cooled to 50° C. and the underpressure is increased to about 105 mbar. With stirring, 176 g (2.2 mol) of an aqueous 50% sodium hydroxide solution are continuously added dropwise, and the added water as well as the water formed is distilled off together with epichlorohydrin as an azeotropic mixture. After the reaction is complete, the reaction mixture, cooled to room temperature, is diluted with 300 ml of epichlorohydrin and filtered through diatomaceous earth and is then extracted with a solution of sodium hydrogen phosphate (10%). The organic phase is dried over magnesium sulfate and is then concentrated in a rotary evaporator under waterjet vacuum, giving 255 g (85.8%) of the desired product.

$T_g$ value: 26.4° C. (DSC at 20° C./min heating rate)
softening point: 65.3° C. (acc. to DIN 51920, 2.0° C./min heating rate)

epoxy value: 5.63 equivalents/kg (79.5% of theory)
LC-MS: monomeric and dimeric product The idealised monomeric product corresponds to the glycidylisation product of formula I, wherein Z is a direct bond, $R_1, R_2, R_3$ and $R_4$ are glycidyl, and $R_5, R_6, R_7$ and $R_8$ are methyl.

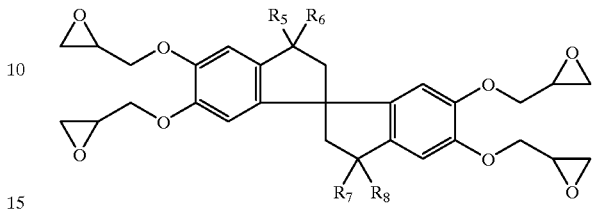

Example 2(a)

Advancement of SBI-G with hexahydrophthalic acid anhydride 90.0 g(0.4761 mol) of SBI-G of Example 1 are stirred together with 10.00 g (0.0649 mol) of cis-hexahydrophthalic acid anhydride (cis-HHPA) for 60 min at 120° C., an increase of the viscosity being observed. The product obtained consists of a mixture of compounds and has the following properties:

epoxy value: 4.01 equivalents/kg of substance (115.9% of theory)
$T_g$ value: 68.8° C. (DSC at 20° C./min heating rate)
softening point: 112.8° C. (acc. to DIN 51920, Mettler, 2° C./min heating rate)
GPC (against polystyrene standard) molar masses up to 20 000
acid number <3 mg KOH/g Idealised, one of the compounds present in the product corresponds to the following formula I:

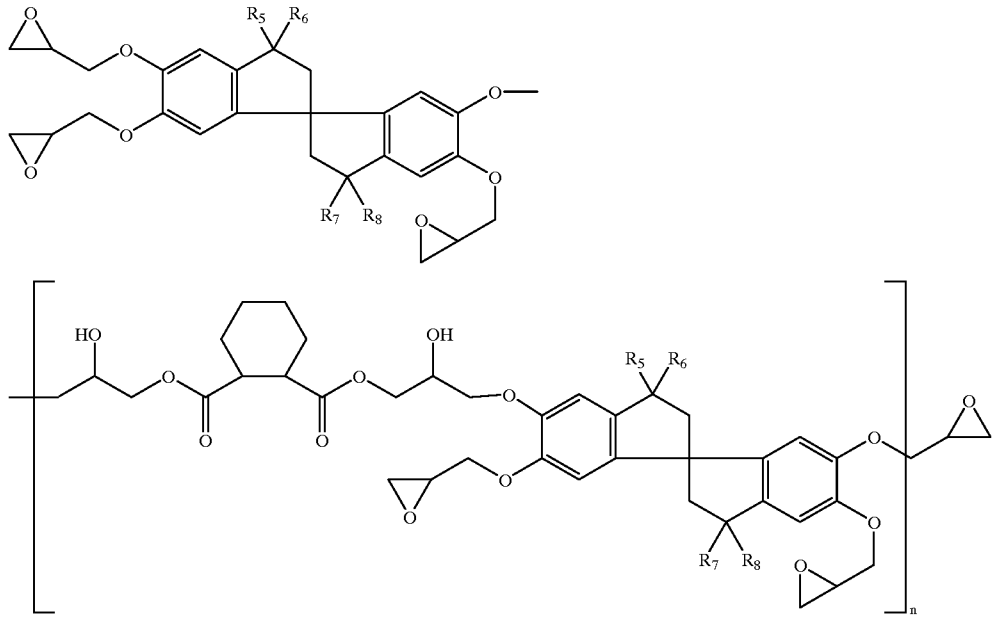

wherein $R_5, R_6, R_7$ and $R_8$ are methyl.

Example 2(b)

Advancement of SBI-G with cyclohexane-1,4-dicarboxylic acid 30.0 g (0.0531 mol) of SBI-G of Example 1 are stirred together with 3.33 g (0.0193 mol) of cyclohexane-1,4-dicarboxylic acid (Eastman) for 65 min at 140° C., an increase of the viscosity being observed. The product obtained consists of a mixture of compounds and has the following properties:

epoxy value: 3.23 equivalents/kg (89.7% of theory)
softening point: 132.2° C. (acc. to DIN 51920, Mettler, 2° C./min heating rate)
$T_g$ value: 70.52° C. (DSC, midpoint, 20° C./min heating rate)
acid number: <3 mg KOH/g Idealised, the product conforms to the following formula:

c) 83.50 g of the adduct obtained from the above reaction (Example 3b) are reacted according to the glycidylisation method described in Example 1 with 145 ml (1.85 mol) of epichlorohydrin, 20.4 g (0.093 mol) of a 50% aqueous solution of TMAC and 23.23 g (0.29 mol) of NaOH as an aqueous 50% solution. After the reaction is complete, the reaction mixture, cooled to room temperature, is diluted toluene and charged with a 10% solution of sodium hydrogen phosphate. The insoluble product is removed by filtration and dried overnight in a vacuum oven at 70° C./50 mbar, giving 64.06 g of a solid product.

epoxy value: 1.80 equivalents/kg of substance (66.9% of theory)
softening point: 115.9° C. (acc. to DIN 51920, 2° C./min heating rate)
$T_g$ value: 39.89° C. (DSC at 20° C./min heating rate)

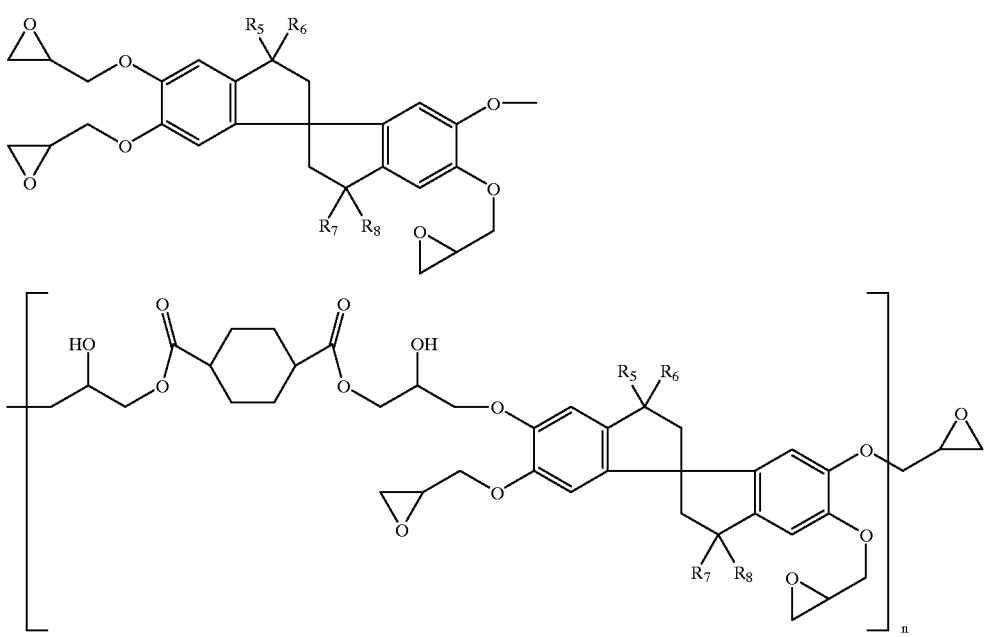

Example 3 a) 90.78 9 (0.267 mol) of SBI (according to Example A) are made into a slurry in 538.24 g (3.200 mol) of hexamethylene diisocyanate. Subsequently, 300 ml of tetrahydrofuran (THF) are added and the mixture is refluxed for 2 hours under nitrogen. The solvent is then removed under vacuum and the reaction mixture is heated for a short time to 125 ° C. Excess hexamethylene diisocyanate is then removed by distillation (96° C., 0.1 mbar).

b) 74.48 g (1.200 mol) of ethylene glycol are added to 150 ml THF. A solution consisting of 101.3 g of the product of the above reaction (Example 3a) in 200 ml of THF is then added dropwise to this mixture at 75° C. over 45 minutes. 30 minutes after the addition, the solvent is removed under vacuum, the temperature of the reaction mixture rising to 120° C. Excess ethylene glycol is removed by short-path distillation (180° C., 16 mbar).

Idealised, the product conforms to the following formula:

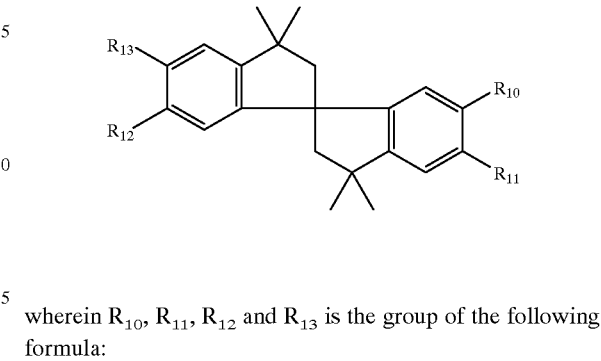

wherein $R_{10}, R_{11}, R_{12}$ and $R_{13}$ is the group of the following formula:

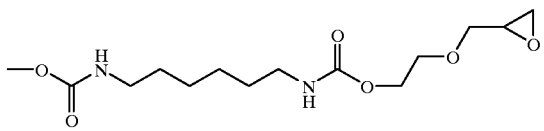

Example 4

Use of SBI-G as crosslinker for powder coatings based on polyesters.

The substances listed in Table I for formulation B are mixed in the indicated amounts and are homogenised or extruded at 110° C. in a twin-screw extruder (Prism TSE 16 PC). The cooled extrudate is ground to an average particle size of about 40 μm (ultracentrifuge mill Retsch ZSM 1000). Particles having a particle size of >100 μm are removed by sieving.

The gel time of the powder coating formulation B (acc. to ISO standard 8130) is 160 s at 180° C.

The powder coating is sprayed electrostatically onto test panels (Q-panel, of Q-Panel).

The storing conditions and coating thicknesses correspond to the data in Table II.

The other powder coatings listed in Table I are prepared in analogy to Example 4.

Their properties are summarised in Table II.

Compared to the reference systems 1 and 2 (comprising traditional hardeners), powder coating test panels which are coated with the novel hardener are distinguished by very beautiful surfaces and substantially improved flow. The aspects of the panels of Example A as well as those of Example B readily bear comparison with panels coated with the so-called "high flow" hybrid powders or also with wet coating compositions.

TABLE I (powder coating formulations)

| Formulation [% by weight] | A | B Example 4 | Reference 1 | Reference 2 |
|---|---|---|---|---|
| polyester | Crylcoat 430[1] 57.49 | Grilesta V78-3[2] 57.18 | Grilesta V78-3[2] 59.12 | Crylcoat 430[1] 60.27 |
| hardener | SBI-G 4.91 DGT[4] 1.57 | SBI-G 7.78 | PT 910[3] 5.68 | TGIC[3] 3.70 |
| benzoin | 0.20 | 0.20 | 0.20 | 0.20 |
| Acrylron[5] | 1.50 | 1.50 | 1.00 | 1.50 |
| Cat. (DT 3126-1)[6] | 1.00 | — | 1.00 | 1.00 |
| TiO$_2$[7] | 33.33 | 33.33 | 33.00 | 33.33 |

[1]UCB, Belgium
[2]EMS Chemie, Switzerland
[3]Araldite ® PT 810 (triglycidl isocyanurate [TGIC]) and Araldite ® PT 910, Ciba Speciality Chemicals
[4]diglycidyl terepthalate
[5]Acrylron ®, flow control agent based on a butylated polyacrylate
[6]accelarator (catalyst), Ciba Specialty Chemicals
[7]Kronos 2160, Kronos International Germany

TABLE II (properties of the coatings)

| | A | B | Reference 1 | Reference 2 |
|---|---|---|---|---|
| gel time at 180° [s] | 500 | 160 | 330 | 450 |
| cure | 200° C. 15 min | 200° C. 15 min | 200° C. 15 min | 200° C. 15 min |
| coating thickness [μm] | 50 | 58 | 55 | 57 |
| gloss 60° [%] | 94 | 95 | 94 | 95 |
| yellowness index[8] | 0.5 | 1.2 | 0.5 | −0.5 |
| cross-hatch adhesion [mark][9] | 0 | 0 | 0 | 0 |
| Erichsen indentation [mm][10] | 8.3 | 10 | 10 | 10 |
| impact test, reverse side [kg · cm][11] | 140 | 160 | 160 | 160 |
| acetone test, 1 min [mark][12] | 3 | 3 | 3 | 3 |
| aspect | no orange peel skin | no orange peel skin | orange peel skin | orange peel skin |
| wave scan[13] | | | | |
| k (longwave) | 48.0 | 37.3 | 60.1 | 58.2 |
| k (shortwave) | 53.9 | 36.9 | 64.8 | 66.6 |

[8]Yellowness index, acc. to DIN 6167, determined using a spectral photometer
[9]Acc. to DIN 53151; 0 = highest mark, 4 = lowest mark
[10]Acc. to DIN 53136
[11]The reverse side impact strength is determined by dropping a 2 kg die, at the underside of which there is a ball 20 mm in diameter, underside first from a specific height from the back onto the coated surface. The value indicated is the product of the weight of the die in kg and of the test height in cm at which the coating is still undamaged.
[12]Acc. to DIN 53230. A cotton swab drenched with acetone is placed for 1 min on the coating and this spot is then scratched with a fingernail. Marks: 0 = coating layer unchanged, 5 = coating layer virtually completely dissolved
[13]The surface structure is examined regarding its texture using a "Wave Scan" profilometer, of Byk Gardener. The found k-parameters above about 50 indicate a very unlevel surface and thus unsatisfactory flow. Values in the range of 30 on the other hand denote a very level surface and excellent flow.

Example 5

Use of SBI-G as crosslinker for weather-resistant powder coatings based on polyesters.

The powder coatings listed in Table II are prepared in analogy to Example 4.

The white pigmented unstabilised powder coating test panels obtained are subjected to outdoor weathering. The gloss and yellowness index values obtained at the beginning (time t=0) and after 5 and 10 months, respectively, are compiled in Table IV. The results obtained prove that the novel powder coatings have weather-resistant properties which match the quality of the reference formulations. Even after 10 months of outdoor weathering, the gloss and yellowness index values are on virtually the same scale as the starting values. This is surprising insofar as the claimed SBI-G is an aromatic compound, giving rise to expecatations of the typical bad behaviour of paint systems based on bisphenol A solid resins. Even after a short time, these solid resins show strong yellowing and also chalking, with the corresponding loss in gloss. Quite on the contrary, the SBI-G coatings obtained have values which are comparable to those of the coatings known to be weather-resistant which are obtained with crosslinkers such as TGIC or PT 910.

TABLE III

| Formulation [% by weight] | 10/23 (powder coating formulations) | | | |
|---|---|---|---|---|
| | C | B D | Reference 3 | Reference 4 |
| polyester | Grilesta V78-3[2)] 57.45 | Crylcoat 430[1)] 57.71 | Grilesta V78-3[2)] 59.15 | Crylcoat 430[1)] 60.27 |
| hardener | SBI-G 7.52 | SBI-G 3.84 DGT[4)] 2.42 | PT 910[3)] 5.65 | TGIC[3)] 3.70 |
| benzoin | 0.20 | 0.20 | 0.20 | 0.20 |
| Acrylron[5)] | 1.50 | 1.50 | 1.00 | 1.50 |
| Cat. (DT 3126-1)[6)] | — | 1.00 | 1.00 | 1.00 |
| TiO$_2$[7)] | 33.33 | 33.33 | 33.00 | 33.33 |

[x)]Notes for indices 1 to 7: see Table I

TABLE IV (results of the outdoor weathering of the powder coating formulations of Tab. III)
The outdoor weathering was carried out in Basel (CH) (orientation: south, 45°)

| Formulation | C | D | Reference 3 | Reference 4 |
|---|---|---|---|---|
| coating thickness [μm] | 77 | 57 | 50 | 50 |
| gloss 60°, t = 0 [%] | 95 | 94 | 96 | 96 |
| loss in gloss[14)] [%] after 5 months | 99 | 97 | 96 | 98 |
| after 10 months | 95 | 95 | 97 | 92 |
| yellowness index, t = 0 | 2.4 | 1.4 | −1.2 | −0.5 |
| yellowness index after 5 months | 1.8 | 0.4 | −0.9 | −1.0 |
| after 10 months | 2.2 | 0.6 | −0.6 | −0.8 |

[14)](gloss (t = x)/gloss (t = 0)) × 100

What is claimed is:

1. A polyglycidyl compound having on average more than two glycidyl groups per molecule and a $T_g$ value (determined by DSC, heating rate=20° C./min) higher than 20° C., based on a polyfunctional 1,1'-spirobisindane of formula I or on a mixture of different polyfunctional 1,1'-spirobisindanes of the general formula I

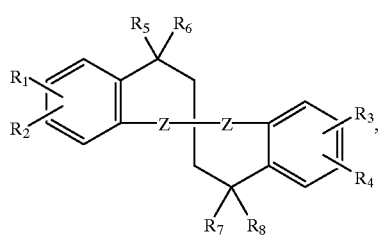

(I)

wherein
Z is a direct single bond or —O—;
more than two of $R_1$, $R_2$, $R_3$ and $R_4$ are —OH, —O—CO—R—CO—OH, —O—R—OH, —O—CO—NH—R—NH—CO—O—R—OH or —[O—C$_m$H$_{2m}$]$_n$—OH, with the proviso that $R_1$, $R_2$, $R_3$ and $R_4$ are not —OH when Z is a direct single bond,
wherein
m is an integer from 2 to 4,
n is an integer from 1 to 20, and
R is C$_1$–C$_8$alkylene, C$_5$–C$_8$cycloalkylene, C$_6$–C$_{14}$arylene or partially hydrated C$_6$–C$_{14}$arylene,
and the remaining $R_1$, $R_2$, $R_3$ and $R_4$ are a hydrogen atom or —O—C$_1$–C$_8$alkyl, —O—C$_5$–C$_8$cycloalkyl, —O—C$_6$–C$_{14}$aryl, partially hydrated —O—C$_6$–C$_{14}$aryl or (meth)acrylate; and
$R_5$, $R_6$, $R_7$ and $R_8$ are each independently of one another C$_1$–C$_8$alkyl, C$_5$–C$_8$cycloalkyl, C$_6$–C$_{14}$aryl, partially hydrated C$_6$–C$_{14}$aryl or a hydrogen atom.

2. A polyglycidyl compound according to claim 1, wherein, in the basic body according to formula I, all $R_1$, $R_2$, $R_3$ and $R_4$ are —OH, —O—CO—R—CO—OH, —O—R—OH, —O—CO—NH—R—NH—CO—O—R—OH or —[O—C$_m$H$_{2m}$]$_n$—OH, and m, n and R have the meanings claimed in claim 1.

3. A polyglycidyl compound according to claim 1, wherein $R_1$, $R_2$, $R_3$ and $R_4$ are —OH or —O—CO—R—CO—OH, and R has the meaning claimed in claim 1.

4. A polyglycidyl compound according to claim 3, wherein R is C$_5$–C$_8$cycloalkan-1,2-ylene.

5. A polyglycidyl compound according to claim 1, wherein $R_5$, $R_6$, $R_7$ and $R_8$ are each independently of one another C$_1$–C$_8$alkyl or a hydrogen atom.

6. A polyglycidyl compound according to claim 5, wherein all $R_5$, $R_6$, $R_7$ and $R_8$ are C$_1$–C$_4$alkyl.

7. A polyglycidyl compound according to claim 1, wherein Z is a direct single bond.

8. A reaction product obtained from the reaction of a polyglycidyl compound having on average more than two glycidyl groups per molecule and a $T_g$ value (determined by DSC, heating rate=20° C./min) higher than 20° C., based on a polyfunctional 1,1'-spirobisindane of formula II or on a mixture of different polyfunctional 1,1'-spirobisindanes of the general formula II

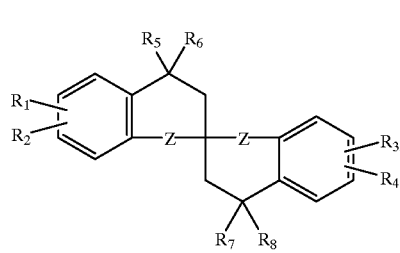

(II)

wherein
Z is a direct single bond or —O—;
more than two of $R_1$, $R_2$, $R_3$ and $R_4$ are —OH, —O—CO—R—CO—OH, —O—R—OH, —O—CO—NH—R—NH—CO—O—R—OH or —[O—C$_m$H$_{2m}$]$_n$—OH, wherein
m is an integer from 2 to 4,
n is an integer from 1 to 20, and R is $C_1$–$C_8$alkylene, $C_5$–$C_8$cycloalkylene, $C_6$–$C_{14}$arylene or
partially hydrated $C_6$–$C_{14}$arylene,
and the remaining $R_1$, $R_2$, $R_3$ and $R_4$ are a hydrogen atom or —O—$C_1$–$C_8$alkyl, —O—$C_5$–$C_8$cycloalkyl, —O—$C_6$–$C_{14}$aryl, partially hydrated —O—$C_6$–$C_{14}$aryl or (meth)acrylate; and $R_5$, $R_6$, $R_7$ and $R_8$ are each independently of one another $C_1$–$C_8$alkyl, $C_5$–$C_8$cycloalkyl, $C_6$–$C_{14}$aryl, partially hydrated $C_6$–$C_{14}$aryl or a hydrogen atom.
with a less than stoichiometric amount of a compound containing two substituents reacting with epoxy groups.

9. A reaction product according to claim 8, which comprises the polyglycidyl compound and the compound containing two substituents reacting with epoxy groups in such amounts, that there are 0.01–0.75 of the groups reacting with epxy resins per one epoxy group of the polyglycidyl compound.

10. A reaction product according to claim 8, wherein the compound containing two substituents reacting with epoxy groups is a compound of formula HO—CO—$R_9$—CO—OH, HO—$R_9$—OH, H—[O—$R_9$—O—CO—NH—$R_9$—NH—CO]$_v$—O—$R_9$—OH or H—[O—$C_uH_{2u}$]$_v$—OH, wherein u is an integer from 2 to 4,
v is an integer from 1 to 20, and
$R_9$ is $C_1$–$C_8$alkylene, $C_5$–$C_8$cycloalkylene, $C_6$–$C_{14}$arylene or partially hydrated $C_6$–$C_{14}$arylene.

11. A reaction product according to claim 10, wherein $R_9$ is $C_5$–$C_8$cycloalkan-1,2-ylene or $C_5$–$C_8$cycloalkan-1,4-ylene.

12. A reaction product according to claim 8, wherein the compound containing the two substituents reacting with epoxy groups is 1,4-cyclohexanedicarboxylic acid or a cyclic anhydride.

13. An epoxy resin mixture having an epoxy value of 1–10 equivalents/kg, which comprises a polyglycidyl compound of formula I or a reaction product of formula II and at least one other compound containing epoxy groups.

14. A process for the preparation of a polyglycidyl compound according to claim 8, which process comprises reacting a polyfunctional 1,1'-spirobisindane of formula II or a mixture of different polyfunctional 1,1'-spirobisindanes of formula II by known processes with a stoichiometric excess of glycidyl chloride or β-methylglycidyl chloride in the presence of a suitable catalyst and, after adding a base, removing excess glycidyl chloride or β-methylglycidyl chloride by distillation.

15. A process for the preparation of a polyglycidyl compound according to claim 8, which comprises first etherifying a polyfunctional 1,1'-spirobisindane of formula II or a mixture of different polyfunctional 1,1'-spirobisindanes of formula II with unsubstituted allyl halides or with allyl halides substituted by $C_1$–$C_4$alkyl radicals and then oxidizing it with suitable oxidants to the epoxy.

16. A curable composition, which comprises a polyglycidyl compound of formula II or its reaction products according to claim 8, and a compound reacting therewith with crosslinking.

17. A powder coating based on a curable composition according to claim 16.

18. A powder coating according to claim 17, wherein the compound reacting with crosslinking is a carboxyl-terminated polyester and/or a free carboxyl group-containing acrylic resin.

19. A curable composition, which comprises a reaction product according to claim 8, and a compound reacting therewith with crosslinking.

20. A curable composition, which comprises an epoxy resin mixture according to claim 13, and a compound reacting therewith with crosslinking.

21. A powder coating based on a curable composition according to claim 20.

22. A powder coating according to claim 21 wherein the compound reacting with crosslinking is a carboxyl-terminated polyester and/or a free carboxyl group-containing acrylic resin.

* * * * *